Figure 2:
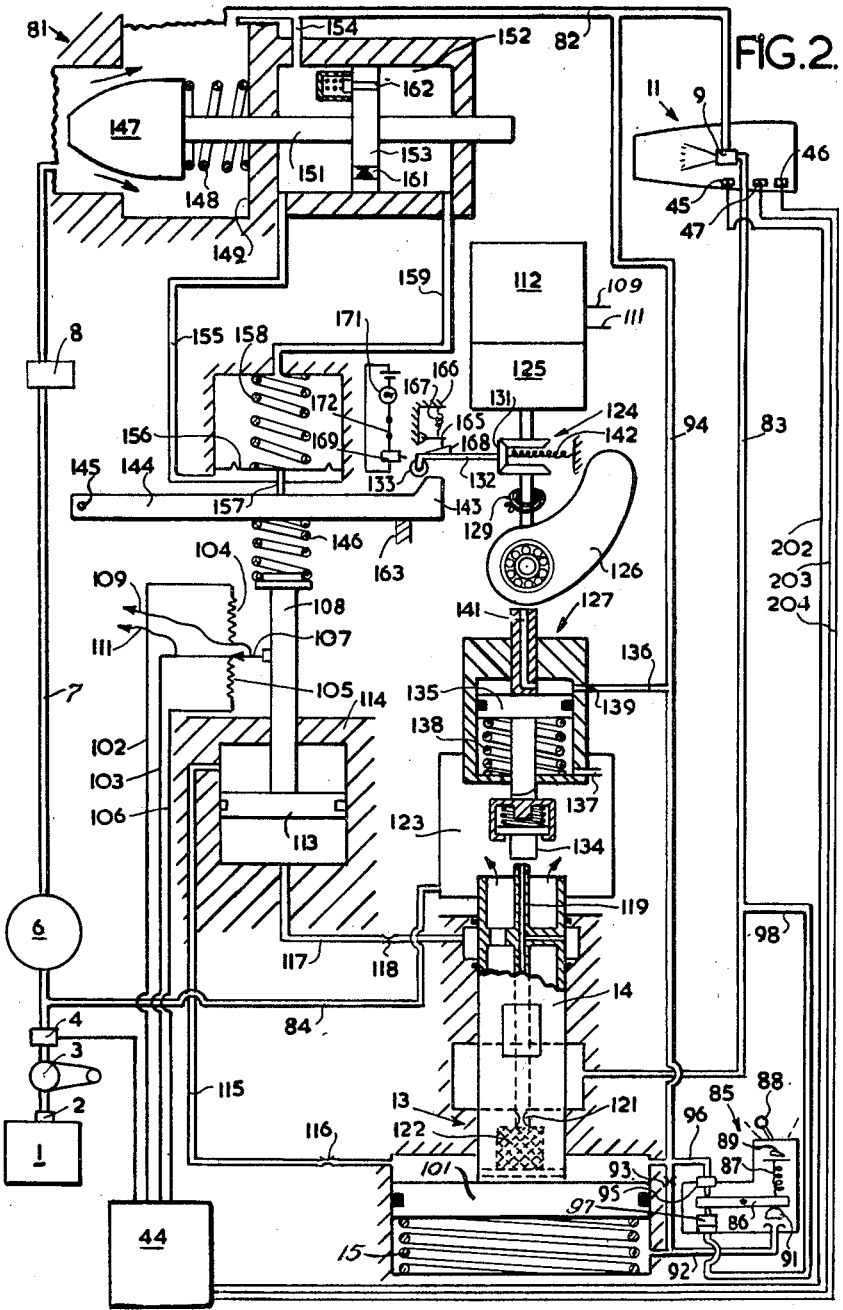

Feb. 2, 1965  S. R. TYLER ETAL  3,168,102
FUEL SUPPLY SYSTEMS
Filed Feb. 27, 1962  2 Sheets-Sheet 1

FIG.1.

INVENTORS
STANLEY R. TYLER
EDGAR G. HUNT
WILLIAM J. BOOTLE

By Reynolds & Christensen
ATTORNEYS

United States Patent Office 3,168,102
Patented Feb. 2, 1965

3,168,102
FUEL SUPPLY SYSTEMS
Stanley R. Tyler, Cheltenham, Edgar G. Hunt, St. Marks, Cheltenham, and William J. Bootle, Cranham, England, assignors to Dowty Fuel Systems Limited, Cheltenham, England
Filed Feb. 27, 1962, Ser. No. 175,906
Claims priority, application Great Britain, Feb. 28, 1961, 7,345/61
4 Claims. (Cl. 137—18)

This invention relates to fuel supply systems for engines, for example gas turbine engines.

In some engines, it is important that an engine should not be over-fueled when it is accelerated. For example, if a gas turbine engine is over-fueled a phenomenon known as stall or surge may occur which may cause excessive temperatures and pressures resulting in damage to the engine. In such engines, an acceleration control may be provided which ensures that when it is desired to accelerate the engine, the engine is not over-fueled. Such an acceleration control limits the amount of fuel which can be supplied to the engine, this amount of fuel usually depending on its speed and also on other operating conditions.

A failure in such an acceleration control may result in the supply of fuel to the engine being unduly limited or not sufficiently limited and this invention is concerned with means for detecting a failure in the acceleration control which results in either no acceleration at all or an insufficient acceleration when it is attempted to accelerate the engine. The failure thus detected includes a failure in the acceleration control of a gas turbine engine which causes over-fueling of the engine, since the engine will initially accelerate and then cease accelerating prior to a stall or surge occurring.

The present invention provides a fuel supply system for an engine including a fuel pump arranged to deliver fuel to the engine, a first control means capable of adjusting and normally operable to adjust fuel flow to the engine, a second control means capable of adjusting fuel flow to the engine, and safety means responsive to failure of the first control means to transfer adjustment of fuel flow to the second control means.

The present invention also provides a fuel supply system for an engine including means for supplying fuel to the engine, means for controlling the supply of fuel to the engine, means for limiting the supply of fuel to the engine to prevent over-fueling of the engine, means responsive to selection of an increased engine speed by the control means for detecting a restricted acceleration or no acceleration of the engine, and safety means for rendering the limiting means inoperative and/or indicating a failure of the limiting means, said safety means being actuated by operation of the said means responsive to selection of an increased speed and the said acceleration detecting means when an increased speed has been selected and a restricted acceleration or no acceleration occurs.

The acceleration detecting means may be arranged to prevent actuation of the safety means when a satisfactory acceleration is detected and the means responsive to a selection of increased speed may be arranged so that after a delay it actuates the safety means unless such actuation is prevented by the acceleration detecting means.

Two embodiments of the present invention will now be described, by way of example, with reference to the accompanying drawings of which, FIGURE 1 is a diagrammatic view of a fuel supply system for an aircraft gas turbine engine according to one embodiment and, FIGURE 2 is a similar view of a fuel supply system for an aircraft gas turbine engine according to the second embodiment.

With reference to the accompanying drawings, FIGURE 1 shows a fuel supply system for an aircraft gas turbine engine and which includes a fuel supply tank 1 from which fuel is pumped by a boost pump 2 through a shut-off valve 3, operable by the pilot, through an electrical flow meter 4, and through a filter 5 to the main pump 6, which is a positive displacement pump. From the main pump 6, fuel passes along the line 7 through a minimum pressure valve 8 to spill burners 9 in the gas turbine engine 11. Only one burner 9 is shown, to represent any number required. Spill flow from the burners 9 passes along the line 12 to a spill valve 13 and then through the line 10 back to the filter 5 on the low pressure side of the main pump 6.

The spill valve 13 includes a valve member 14 which is resiliently urged in the closing sense by a spring 15. A rod 16 extends from the valve member 14 and by means of this rod 16, the position of the valve member 14 is controlled by a governor control which is indicated generally by the numeral 17, and an acceleration control 18.

The governor control 17 includes an all-speed governor having pivoted fly-weights 19 which are rotated at a speed proportional to the speed of the engine by a drive shaft 20. Both the fly-weights 19 while rotating, and a spring 21, urge a spool valve 22 upwardly. The spool valve 22 acts on one arm of a lever 23 which is pivotally secured to a lug 24 attached to a housing 25 which houses the governor control 17 and also the acceleration control 18. A roller 26 located on the end of a rod 27 acts on the same arm of the lever 23 as the spool valve 22, but the roller 26 acts on the lever 23 in the opposite sense to the spool valve 22. The position of roller 26 and lever 27 is adjustable along lever 23 by a speed selector lever 28 controllable by the pilot.

A lever 29 pivotally secured at one end to a lug 31 mounted within the housing 25 is acted upon at its other end by a spring 32. The spring 32 resiliently urges the lever 29 against the roller 26 and according to the position of the roller 26 as selected by the pilot's lever 28 so the force exerted by the spring 32 on the spool valve 22 through the lever 29, roller 26 and lever 23 is variable.

The spool valve 22 forms part of a servo mechanism which is supplied with fuel at high pressure through a line 33 and a filter 34 from the high pressure side of the main pump 6. According to the position of the spool valve 22, high pressure fuel may be completely stopped from passing through line 33 or may be allowed to pass from line 33 through line 35 or line 36 to one or the other side of a servo piston 37. The servo piston 37 is secured to a rod 38 which by its movement governs the pivotal movement of a lever 39 about its fulcrum at one end upon a lug 40 projecting from the housing 25. The other end of the lever 39 acts upon a stop 41 carried by the rod 16 which is attached to the spill valve member 14. The arm of lever 23 opposite to the arm which is acted upon by spool valve 22 carries a spring 42 which acts upon rod 38.

When the engine is running at a constant speed, the fly-weights 19 and the spool valve 22 are in the positions shown in FIGURE 1 and the various parts of the all-speed governor are in equilibrium. If the pilot desires to accelerate the engine, he moves lever 28 forward and this movement causes roller 26 to move to the right as shown in FIGURE 1, thus causing spring 32 to exert a greater force on spool valve 22, which is thus forced to move in the direction of the fly-weights 19, or downwardly as viewed in FIGURE 1, so that high pressure fuel passes from the line 33 to the line 35 and forces the servo piston 37 downwardly. Fuel on the opposite side of servo piston 37 passes along the line 36 and along a line 43 to the interior of the housing 25 and then along the line 10 to the low pressure side of the main pump 6.

This movement of servo piston 37 causes the lever 39 to move away from the rod 16 and the spring 15 causes the valve member 14 to move in a closing sense in the direction of the lever 39. As the spill valve closes, this reduces the spill flow from the burners 9 and more fuel is burnt in the engine 11 and thus the engine accelerates. When the engine has reached the speed selected by the pilot's lever 28, the fly-weights 19 which are driven at a speed proportional to the speed of the engine force the spool valve 22 back to its original position as shown in FIGURE 1 and the lever 39 becomes stationary and hence also does the spill valve member 14.

When the pilot desires to decelerate the engine, the reverse occurs and the spool valve 22 moves upwardly and, with a consequent upward movement of servo piston 37, the lever 39 moves upwardly and opens the spill valve 13 by movement of the valve member 14. This allows more spill flow from the burners 9 and hence the engine decelerates until the various parts of the all-speed governor are once more in equilibrium.

In order that the engine should not be over-fueled during an acceleration, the acceleration control 18 functions to limit the amount of fuel supplied to the engine according to the speed of the engine and other conditions existing in the engine. The acceleration control 18 is controlled by an electronic computer 44 which computes how much fuel in excess of that which is actually being supplied to the engine could in fact be supplied without likelihood of causing an engine stall or surge. The flow meter 4 supplies an electrical signal along line 201 to the computer 44 which indicates the actual supply of fuel to the engine and an engine speed indicator 45 located in the engine supplies along line 202 a signal of engine speed ($Nc$). A pressure transducer 46 supplies to the computer 44 along line 204 a signal of the inlet pressure of the compressor of the engine (C.I.P.) and a further pressure transducer 47 supplies along line 203 a signal of compressor delivery pressure (C.D.P.). The computer may be such as is described in U.S. patent application Serial No. 182,305, filed March 26, 1962.

If the actual flow of the fuel to the engine is $Qm$ and the maximum permissible fuel to the engine is $Q$, then the computer 44 supplies to the acceleration control 18 along line 205 a signal which is proportional to $Q-Qm$. The computer 44 is arranged that such a signal is only supplied to the acceleration control 18 when $Qm$ is greater than $Q$, that is to say when the fuel being supplied to the engine actually becomes greater than that permissible.

The acceleration control 18 includes an electrically controlled servo mechanism 48 which operates to move a flapper 49 which is positioned between two orifices leading from a pair of high pressure servo fuel lines 51 and 52 to a return conduit 53 which leads to the interior of housing 25. Lines 51, 52 are fed with high pressure servo fuel through restrictors 54, 55 respectively from a line 56 which receives high pressure fuel from the outlet side of the main pump 6 past filter 34. When the servo mechanism 48 receives a signal from the computer 44 the flapper 49 is moved to restrict flow of fuel from the line 52 and the increased pressure in line 52 moves a servo piston 57 upwardly. This servo piston 57 carries a rod 58 which when functioning to limit the supply of fuel to the engine engages the stop 41 on the end of the rod 16. If the computer 44 fails, with the result that no signal is applied along line 205 to servomechanism 48, the flapper 49 moves to a position midway between the two orifices leading from the lines 51 and 52, so as to allow equal flows into the return conduit 53. Thus movement of the servo piston 57 is not prevented.

During every day use of fuel systems in aircraft, faults may develop and if a fault should develop in the computer 44 so that it either sends a spurious signal or no signal at all to the acceleration control 18, when it should send a signal, there is provided a fail safe mechanism which disconnects the computer 44 from the aceleration control 18 so as to render it inoperable and also warns the pilot that such a failure has occurred. This fail safe mechanism is described below.

When the pilot selects an acceleration by moving his lever 28 forwardly, then as previously described, such movement causes a downward movement of the servo piston 37. One end of the rod 38 projects from the housing 25 and, when moved downwardly by reason of an acceleration being selected, actuates a switch 61 to complete an electrical circuit which includes line 207 and a relay switch S1, the function of which will be described later.

Besides supplying the $Q-Qm$ signal, the computer 44 also supplies a signal of acceleration by differentiating the speed signal, and this signal is applied along line 206 to a relay switch S2.

The $Q-Qm$ signal from the computer 44 passes along line 205 and two lines 62, 63 in parallel before it reaches the acceleration control 18. The electrical line 62 includes a normally closed switch 64 within switch S1. The line 63 includes a normally open switch 65 in switch S2.

A fail safe electrical circuit includes a normally open switch 66 in switch S1 and a normally closed switch 67 in switch S2. The fail safe circuit also includes a relay switch S3, a switch S4 which is normally closed but which can be opened by the pilot, a warning light 68 and an electrically operated valve 69, which when actuated causes a restriction in a line 70 which brings two sides of a dashpot 71 into communication. The dashpot 71 includes a piston 72 secured to the rod 27 and although fluid normally flows freely through the conduit 70, this freeflow is restricted when the valve 69 is actuated and this restricts the movement of the rod 27.

The switch S3 controls a switch 73 in the $Q-Qm$ signal line 205 between the computer 44 and the parallel lines 62, 63. The switch 73 is normally closed but is opened upon actuation of the relay coil of switch S3. When open it is held in the open position by a mechanical latch 74 and spring 75, but this latch 74 can be actuated to allow the switch 73 to close by means of a manually operable device 76.

When the pilot selects an acceleration, it is arranged that when the engine accelerates the acceleration signal from the computer 44 to the switch S2 should actuate switch S2 before the acceleration selected signal actuates switch S1. This is achieved by a delay device incorporated in switch S1 which delays operation of the switch for a period slightly greater than the time constant of the engine, i.e. the time taken by the engine to commence acceleration in response to an increase in fuel flow. If, when acceleration is selected, the engine accelerates normally, the acceleration signal from the computer 44 will operate switch S2 and this operation opens switch 67 in the fail safe circuit and closes switch 65 in line 63. Subsequent actuation of the switch S1 in the acceleration signal line 207 opens switch 64 and closes switch 66, but the fail safe electrical circuit is not completed since switch 67 has already been opened by the acceleration signal.

If, when an acceleration is selected, an acceleration does not occur or ceases due to an impending stall or surge of the engine which might be allowed by a failure of the computer, no acceleration signal will be received from the computer and switch 67 will remain closed and switch 65 will remain open. After a short delay, the acceleration selected signal will operate switch S1 and switch 64 will be opened and switch 66 will be closed. Thus both switches 64 and 65 in the $Q-Qm$ signal line are open and no signal is sent to the acceleration control 18. Also both switches 66 and 67 in the fail safe electrical circuit are now closed and this circuit is, therefore, actuated to cause the warning light 68 to come on and also the valve 69 to be operated so that the pilot feels an increased resistance to movement of the lever 28. Switch S3 is also actuated and switch 73 is opened and retained in the open position by the latch 74. Thus no signals can be sent to the acceleration control 18 from the computer 44 until the latch 74 is manually operated by the device 76 to allow the switch 73 to close. After a failure has occured, the pilot may, if he so wishes, break the fail safe electrical circuit by opening switch S4.

A second embodiment of the invention is shown in FIGURE 2 and where possible like reference numerals will be used to indicate those features which also appear in the embodiment described with reference to FIGURE 1. After leaving the main fuel pump 6, which is an engine driven positive displacement pump, fuel at high pressure passes along the line 7 through the minimum pressure valve 8 and then through an acceleration detector 81. Fuel then passes along the line 82 to the spill burners 9 of the engine 11 and then along the spill flow line 83 to the spill valve 14 and then through a return line 84 to the inlet side of the pump 6.

An all-speed governor 85 includes a lever 86 pivotally mounted at its centre point and acted upon at one end by a spring 87, the compression of which can be varied by movement of the pilot's lever 88 which acts upon the spring 87 through a cam 89. A half ball valve 91 is secured to the same end of lever 86 as that acted upon by the spring 87 and this ball valve 91 controls the flow of servo fuel through line 92 which is connected through a restrictor 93 and line 94 with the high pressure fuel line 82.

A feature of spill burners where fed by an engine driven positive displacement pump is that the pressure difference between the pressure in the supply line and the pressure in the spill line is proportional to the speed of the engine. This is described in U.S. Patent No. 2,738,003. Thus the force of the spring 87 on the lever 86 is balanced when the speed of the engine is constant by the pressure difference between the fuel supply line and the spill line. The pressure from the supply line is applied through bellows 95 which receive fuel from the high pressure line 94 through a line 96 and the pressure in the spill line 83 is applied to bellows 97 which receive fuel from the line 83 through the line 98. It will be seen that the supply pressure and the spill line pressure act in opposite directions on lever 86. The half ball valve 91 controls movement of a servo piston 101 which is attached to the spill valve member 14. When the engine is at a constant speed, the half ball valve 91 is slightly spaced from the end of line 92 so that the pressure of fuel on opposite sides of servo piston 101 causes equal forces to be applied to piston 101 in opposite directions. Thus a certain compression in the spring 87 always corresponds to a certain speed of the engine as sensed by the pressure difference between the fuel supply and spill lines. If the pilot wishes to accelerate or decelerate the engine, he merely moves his lever 88 so as to increase or decrease the compression of the spring 87 respectively.

A computer 44a receives information concerning the speed of the engine and the inlet and delivery pressures of its compressor and computes the difference between the amount of fuel actually being supplied to the engine and the maximum amount of fuel which could be supplied to the engine if it were desired to accelerate the engine. This information is applied as an electrical signal by lines 102 and 103 across a resistance 104 which is connected in series with an electrical resistance 105. The connections are arranged so that line 102 is always positive relative to line 103. A further line 106 connected to the opposite ends of resistance 105 to which resistance 104 is connected ensures that this end of resistance 105 is negative with respect to line 103. If desired a battery could maintain line 106 negative with respect to line 103.

The resistances 104 and 105 act as a potentiometer which has a sliding contact 107 carried by a rod 108, and a lead 109 from the sliding contact 107 together with a lead 111 connected to line 102 lead to an electric motor 112. Rod 108 is connected to a servo piston 113 sliding in a cylinder 114. The annulus side of piston 113 is connected through a line 115 and a restrictor 116 to the annulus side of piston 101 and therefore to high pressure servo fuel in line 94. The other side of servo piston 113 is connected through a line 117 and restrictor 118 to a conduit 119 in the spill valve member 14. This conduit 119 is in communication with the annulus side of servo piston 101 through a restrictor 121 and a filter 122 and is also in communication with a low pressure zone 123 from which line 84 returns fuel to the inlet side of pump 6.

The motor 112 which is controlled by the signal from the computer via the potentiometer formed by the resistances 104 and 105 and an amplifier drives a clutch 124 through a gearbox 125. This clutch 124 is connected to a member 126 which functions as a cam and controls a servo mechanism 127. The member 126 is biased by a spring 129 in a counterclockwise direction as shown in the drawing. The clutch 124 includes a clutch control member 131 connected to a rod 132 on one end of which is a roller 133. The function of the clutch control member 131 will be described later.

The motor 112, gearbox 125 and the cam member 126 are all part of an acceleration control which also includes the servo mechanism 127. The servo mechanism 127 merely positions a stop 134 which controls flow of servo fuel out of conduit 119 and this stop 134 is positioned by servo mechanism 127 in accordance with the position of the cam member 126. Servo mechanism 127 includes a servo piston 135 to one side of which is fed high pressure servo fuel from the line 94 through a line 136 and the other side of piston 135 is open to the low pressure zone 123 via a conduit 137. Piston 135 is also urged towards the cam member 126 by a spring 138. High pressure fuel in the conduit 136 enters into the chamber on the one side of the piston through a restrictor 139 and is able to leak away from this chamber through a conduit 141, the end of which is controlled by the cam member 126. Servo mechanism 127 is arranged to be stronger than the servo mechanism which includes the servo piston 101.

The restrictors 139 and 121 are chosen of such relative sizes that the bleeds allowed by the cam valve 126 and valve 134 have no appreciable effect on the pressure in lines 82, 84 which is applied to the bellows 95 through line 96.

The clutch control member 131 is resiliently maintained to engage the clutch 124 by a spring 142, but under certain circumstances which will be described later the clutch control member 131 may be withdrawn to disengage the clutch 124 by a pawl 143 on a lever 144 which is pivotally secured at 145. A spring 146 acts between the rod 108 and the lever 144. The spring 146 is arranged so that when the rod 108 is in the position shown in the FIGURE 2 no force is exerted on the lever 144 by the spring 146. The spring 146 forms part of a means for detecting a selection of an acceleration.

The acceleration detector 81 detects an actual acceleration in the speed of the engine by virtue of an increased fuel flow from the pump 6, which is a positive displacement engine driven pump. A shaped member 147 which is located in the fuel flow is balanced against the force of the fuel flow by a spring 148 acting between a housing 149 and the member 147. A rod 151 connected to the member 147 extends through the housing 149 into a chamber 152 and carries a piston 153 sliding in chamber 152. The volume on one side of piston 153 is supplied with high pressure fuel from line 82 through line 154 and this side of piston 153 also leads through line 155 to one side of a diaphragm 156 which carries a rod 157 acting on lever 144. A spring 158 on the opposite side of diaphragm 156 also urges diaphragm 156 towards lever 144. The volume on the other side of the piston 153 leads through a line 159 to the opposite side of the diaphragm 156 and acts on the diaphragm in the same direction as the spring 158. The piston 153 houses a restrictor 161 and a pressure relief valve 162 which prevents pressure on one side of the piston 153 from rising above a predetermined value.

For any particular speed of the engine, the member 147 will have a particular position corresponding to the characteristics of the spring 148. Normally, therefore, the pressures on opposite sides of the piston 153 will be equal and lever 144 will be urged by spring 158 against a stop 163.

In normal operation of the system, the motor 112 is actuated by computer 44a and movement of sliding contact 107 in accordance with movement of servo piston 113 so that the cam member 126 positions the stop 134 in such a position near the conduit 119 that the forces on servo piston 113 become balanced. Thus in deceleration of the engine and small accelerations where the tendency is not to overfuel the engine, the cam member 126 follows the movement of the spill valve member 14 to tend to bring the servo piston 113 to the position shown in FIGURE 2.

When the pilot wishes to accelerate the engine, he will move his lever 88 to compress the spring 87 and this will cause servo piston 101 to move spill valve member 14 in a closing sense. This movement of the spill valve member 14 will cause the end of conduit 119 to approach the stop 134 thus restricting flow of fuel through the conduit 119 and causing a rise of pressure in line 117 and therefore urging piston 113 in a direction towards the lever 144. As soon as piston 113 commences to move, the sliding contact 107 moves along resistance 104 and a voltage is applied to the motor 112 which then functions to rotate cam member 126 in a counterclockwise direction. The servo mechanism 127 follows the movement of the cam and moves stop member 134 away from the end of conduit 119. The voltage applied to the motor 112 is proportional to the permissible increase in fuel when accelerating and the stop 134 is consequently positioned to prevent this increase being exceeded.

The closing of the spill valve 14 results in more fuel being supplied to the burners 9 and if the engine accelerates, a greater force will be exerted by the fuel, and piston 153 is moved to the right as shown in the drawing, thus creating an increased pressure acting on diaphragm 156 which urges the diaphragm 156 towards the lever 144. This increased pressure, which results from an acceleration of the engine, holds the lever 144 against the stop 163.

Due to the presence of restrictor 118, servo piston 113 does not reach its limit of movement in the direction of lever 144 until after the engine has commenced to accelerate. Therefore, the increased pressure acting on the diaphragm 156 which holds the lever 144 against the stop 163 occurs before the movement of servo piston 113 commences the spring 146 sufficiently to cause the spring 146 to exert an appreciable force on lever 144.

If the computer 44a fails and an acceleration, when selected, does not occur or ceases due to an impending stall or surge of the engine, there will be no increased output from the positive displacement pump 6 and the member 147 will not be moved to the right as shown in the drawing and no increased pressure will act on the diaphragm 156 to urge it towards lever 144. Therefore, when spring 146 is compressed by movement of the servo piston 113, the force exerted by the spring 146 will force the lever 144 upwards from the stop 163 and the pawl 143 engages roller 133 so as to move rod 132 to the left and withdraw clutch control member 131 from the clutch 124.

The spring 129 then rotates cam member 126 in an anti-clockwise direction to the limit of its movement in that direction, which is the position shown in FIGURE 2 and the servo-mechanism causes the stop 134 to move upwardly accordingly. Therefore the acceleration control is rendered inoperative and control of the engine is then determined entirely by the pilot's adjustment of lever 88.

A latch 165 pivotally carried by a support 166 and urged downwardly by a spring 167 engages a pawl 168 carried by the rod 132 when the rod 132 is moved by the pawl 143 and retains the clutch control member 131 out of engagement with the clutch 124 until the latch 165 is released manually. Thus once the computer 44a fails and the acceleration control is rendered inoperative, the acceleration control remains inoperative until it is manually brought back into operation again.

Movement of the rod 132 to the left by the pawl 143, when the computer 44a fails, causes the rod 132 to engage and actuate a switch 169 to complete an electrical circuit to a pilot's warning lamp 171. A switch 172 in the circuit enables the pilot to open the circuit if he desires.

When the computer 44a is functioning normally, a selected deceleration of the engine causes the sliding contact 107 to move onto the resistance 105 and a current of reverse polarity is set to the motor 112 to cause the cam member 126 to rotate in a clockwise direction. The stop 134 therefore follows the movement of the end of conduit 118 as the engine decelerates. When the system is in equilibrium, the moving contact 107 is at the position shown in FIGURE 2 and no voltage is supplied to the motor 112.

We claim:
1. A fuel supply system for an engine including a pump for supplying fuel to the engine, means for varying the rate of flow of fuel from the pump to the engine, manually-operable means for controlling the fuel-flow varying means, means responsive to engine operating conditions for controlling the fuel-flow varying means to limit the rate of flow of fuel to the engine so as to prevent over-fueling of the engine, safety means operable to render the limiting means inoperative with the manually-operable means remaining operative, means responsive to a satisfactory acceleration of the engine to prevent operation of the safety means, and means responsive to selection of an increased engine speed by the manually-operable means to operate the safety means, after a delay after a selection of increased speed, to render the limiting means inoperative unless such operation of the safety means has been prevented by the acceleration responsive means.

2. A fuel supply system for an engine including a pump for supplying fuel to the engine, means for varying the rate of flow of fuel from the pump to the engine, manually-operable means for controlling the fuel-flow varying means, means responsive to engine operating conditions for controlling the fuel-flow varying means to limit the rate of flow of fuel to the engine so as to prevent over-fueling of the engine, the limiting means including an electrical circuit in which an electrical signal corresponding to the difference between maximum permissible fuel flow and the actual fuel flow is produced to control the fuel-flow varying means, safety means operable to render the limiting means inoperative with the manually-operable means remaining operative, the safety means including two parallel electrical paths in the electrical circuit of the limiting means, the first path being normally conducting and the second path being normally non-conducting, means responsive to a satisfactory acceleration of the engine to render the second path conducting and so prevent operation of the safety means, and means responsive to selection of an increased engine speed by the manually-operable means to render the first path non-conducting and so operate the safety means, after a delay after a selection of increased speed, to render the limiting means inoperative unless such operation of the safety means has been prevented by the conducting condition of the second path caused by the acceleration responsive means.

3. A fuel supply system for an engine including a pump for supplying fuel to the engine, means for varying the rate of flow of fuel from the pump to the engine, manually-operable means for controlling the fuel-flow varying means, means responsive to engine operating conditions for controlling the fuel-flow varying means to limit the rate of flow of fuel to the engine so as to prevent over-fueling of the engine, safety means operable to render the limiting means inoperative with the manually-operable means remaining operative, acceleration responsive means including a device located in the fuel flow to the engine and movable by acceleration of the fuel flow, movement of the device corresponding to a satisfactory acceleration of the engine acting to prevent operation of the safety means, and means responsive to selection of an increased engine speed by the manually-operable means to operate the safety means, after a delay after a selection of increased speed, to render the limiting means inoperative unless such operation of the safety means has been prevented by the acceleration responsive means.

4. A fuel supply system for an engine including a pump for supplying fuel to the engine, means for varying the rate of flow of fuel from the pump to the engine, manually-operable means for controlling the fuel-flow varying means, means responsive to engine operating conditions for controlling the fuel-flow varying means to limit the rate of flow of fuel to the engine so as to prevent over-fueling of the engine, the limiting means including a clutch, safety means operable to disengage the clutch and so render the limiting means inoperative with the manually-operable means remaining operative, means responsive to a satisfactory acceleration of the engine to prevent operation of the safety means, and means responsive to selection of an increased engine speed by the manually-operable means to operate the safety means, after a delay after a selection of increased speed, to render the limiting means inoperative unless such operation of the safety means has been prevented by the acceleration responsive means.

References Cited by the Examiner
UNITED STATES PATENTS

| 2,617,477 | 11/52 | Isreeli | 60—36.4 |
| 2,628,472 | 2/53 | Dray | 60—39.28 |
| 2,851,855 | 9/58 | Gamble | 60—39.28 |
| 3,023,575 | 3/62 | Haase | 60—39.28 |

FOREIGN PATENTS 508,663  12/54  Canada.

SAMUEL LEVINE, *Primary Examiner.*

ABRAM BLUM, *Examiner.*